United States Patent

Soeda et al.

Patent Number: 5,733,367
Date of Patent: Mar. 31, 1998

[54] CEMENT COMPOSITION

[75] Inventors: Koichi Soeda; Katsuo Hosono; Hiroshi Hayashi; Kazuo Yamada; Makoto Matsuhisa; Satoru Ashiyahara, all of Sakuri; Hirokazu Maeda, Kitasoma-gun; Hitoshi Furuta, Sakai; Mitsuo Hattori, Yawara-mura, all of Japan

[73] Assignee: Fuji Oil Company, Limited, Osaka, Japan

[21] Appl. No.: 673,188

[22] Filed: Jun. 27, 1996

[30] Foreign Application Priority Data

Jul. 13, 1995 [JP] Japan ................... 7-177034

[51] Int. Cl.$^6$ .................................. C04B 24/10
[52] U.S. Cl. .............. 106/805; 106/729; 106/730; 106/823; 106/163.01
[58] Field of Search ................ 106/729, 730, 106/804, 805, 823, 163.01

[56] References Cited

U.S. PATENT DOCUMENTS

| | | | |
|---|---|---|---|
| 4,073,658 | 2/1978 | Ohtani et al. | 106/804 |
| 4,573,534 | 3/1986 | Baker et al. | 106/729 |
| 5,120,367 | 6/1992 | Smith et al. | 106/823 |
| 5,366,550 | 11/1994 | Schad | 106/730 |
| 5,403,394 | 4/1995 | Burgand . | |
| 5,575,840 | 11/1996 | Dewacker | 106/805 |

FOREIGN PATENT DOCUMENTS

| | | |
|---|---|---|
| 1 562 406 | 4/1969 | France . |
| 27 07 677 | 9/1977 | Germany . |
| 53-32823 | 3/1978 | Japan . |
| 53-42772 | 11/1978 | Japan . |
| 57-71933 | 5/1982 | Japan . |
| 60-21838 | 2/1985 | Japan . |
| 60-18615 | 5/1985 | Japan . |
| 60-18616 | 5/1985 | Japan . |
| 1 242453 | 9/1989 | Japan . |
| 4 132646 | 5/1992 | Japan . |
| 4 20239 | 7/1992 | Japan . |
| 4 367549 | 12/1992 | Japan . |
| 5 270873 | 10/1993 | Japan . |
| 5 270876 | 10/1993 | Japan . |

OTHER PUBLICATIONS

Database WPI, Derwent Publications, AN–81–35957, SU–A–761 436, Sep. 8, 1980.
Database WPI, Derwent Publications, AN–78–89070, JP–A–53 042 772, Nov. 14, 1978.
Database WPI, Derwent Publications, AN–91–146348, KR–A–9 003 085, May 7, 1990.
Database WPI, Derwent Publications, AN–92–427082, JP–A–04 321 545, Nov. 11, 1992.
Patent Abstracts of Japan, vol. 950, No. 7, JP–A–7–187 745, Jul. 25, 1995.

*Primary Examiner*—Michael Marcheschi
*Attorney, Agent, or Firm*—Oblon, Spivak, McClelland, Maier & Neustadt, P.C.

[57] ABSTRACT

A cement composition comprising a cement base and hemicellulose. The cement composition produces reduced efforescence and less bleeding. Self-leveling materials containing the cement composition also produce reduced efforescence and less bleeding and exhibit improved surface adhesion strength.

9 Claims, No Drawings

CEMENT COMPOSITION

BACKGROUND OF THE INVENTION

1. Field of the Invention

The present invention relates to a cement composition which produces reduced efforescence and less bleeding, as well as to a self-leveling material which contains the cement composition.

2. Background Art

Efforescence is white powder of $CaCO_3$, $Na_2CO_3$, etc. deposited on the surface of a cement composition after the composition is set. Efforescence is formed by the following mechanism: When the composition solidifies, soluble components (a variety of salts such as Ca, Na, K, etc.) of a cement composition which have been dissolved in a kneading water entrapped in the composition transfer to the surface of the composition, and as the moisture in the surface evaporates, the components react with $CO_2$ in the air to form white powder of $CaCO_3$, $Na_2CO_3$, etc. It has been indicated that efforescence readily occurs particularly in winter seasons, when temperature is low. Also, when a self-leveling material (hereinafter referred to as an SL material) is used in a self-leveling construction method (in which a slurry of a cement composition having self-smoothing properties (SL material) is simply poured onto a floor to freely flow thereon, thereby forming a precise horizontal plane; it is a usual practice when employing this method to apply a finishing material onto the surface of the SL material after installation), presence of efforescence hinders adhesion between the SL material and the finishing material. Therefore, additional work such as polishing is needed in order to remove efforescence. In the meantime, generation of laitance is prompted by bleeding, and if new concrete is installed on the concrete which has laitance thereon, the new and old concretes do not sufficiently bond to each other, and do not become satisfactorily united. As a result, cracks may generate from such ununited portions, water may leak, or interior reinforcements may become rusted.

Hitherto, in an attempt to prevent production of efforescence, a number of methods have been proposed including a method in which kneading water is reduced via co-use of a cement base and a water reducing agent, a method in which powders of inert substances which are finer than cement particles are added, a method in which capillary tubes are embedded, and a method in which oils and fats or synthetic resins are added. Even though efforescence may be reduced to some extent via these methods, no conventional method has been completely successful in preventing production of efforescence. In order to prevent solidified SL materials from forming efforescence, the following methods have been proposed among others: in one method, ultra-fine silica particles are contained in SL materials, and in another method, the setting process is controlled. These methods also do not readily or sufficiently prevent production of efforescence. To reduce bleeding, there are methods in which clay minerals such as bentonite are incorporated, or alternatively, water reducing agents for cements or AE agents are used. However, none of these methods provided satisfactory results.

SL materials are primarily used as level adjusters for P tiles, elongated sheets, and other thin articles to be affixed to objects, or for floor-finishing materials such as flooring materials. When SL materials are used for these purposes, they must exhibit tenable adhesion strength between the SL material and the floor-finishing material. Although the minimum strength standard is designated as 49 $N/mm^2$ (5.0 $kgf/cm^2$), surface adhesion strength of SL materials varies depending on environmental conditions. Particularly in summers, separation of materials often occurs to reduce surface adhesion strength of SL materials, and therefore, the above-mentioned minimum strength standard may sometimes not be met. To solve this problem, there is proposed a method in which the amount of a thickener to be added to an SL material is increased to enhance the surface adhesion strength. However, this method is not advantageous in that an increase in the amount of a thickener causes a reduction in fluidity.

SUMMARY OF THE INVENTION

Under the above-mentioned circumstances, the present inventors conducted extensive studies and found that the aforementioned problems are solved if hemicellulose is incorporated into a cement base, leading to completion of the present invention.

Accordingly, the present invention provides a cement composition which produces reduced efforescence even in winters and which bleeds less while retaining its fluidity. The invention also provides an SL material which exhibits improved surface adhesion strength while retaining its fluidity.

In one aspect of the present invention, there is provided a cement composition comprising a cement base and hemicellulose.

In another aspect of the present invention, there is provided a self-leveling material comprising a cement composition, an aggregate, a fluidizing agent, a thickener, and a defoamer; wherein the cement comprises a cement base and hemicellulose.

DESCRIPTION OF PREFERRED EMBODIMENTS

The cement base which may be used in the present invention may be composed solely of cement or may contain inorganic materials if needed. Examples of cement include portland cements such as ordinary cement, high-early-strength cement, ultra high-early-strength cement, moderate heat cement, and sulfate resisting cement; low heat cement; and high belite cement. In the present invention, portland cements are preferably used.

Examples of inorganic materials include gypsum, fly ash, and granulated blast-furnace slag powder. These inorganic materials are preferably incorporated in a cement base in amounts of not more than 30% by weight.

In the present invention, hemicellulose is used as an admixture. The hemicellulose is preferably water-soluble hemicellulose, and more preferably water-soluble hemicellulose obtainable from water-insoluble dietary fibers.

Examples of water-insoluble dietary fibers include fibers of oilseeds, grains, and of sugar-producing crops. Examples of oilseeds include soybean, palm, coconut, corn, and cotton seeds. Generally, oils and fats, proteins, etc. are removed from oilseeds, and resultant residues are used. For example, when soybeans are used to obtain hemicellulose, tofu refuse, which is a by-product in the production of tofu, soybean milk, or separated soybean proteins, may be used. Examples of grains include rice and wheat. Residues of grains from which starch, etc. have been removed are generally used. Examples of sugar-producing crops include sugar cane and beets. Generally used are residues remaining after sugars are removed.

In the present invention, it is preferred to use hemicellulose derived from beans, more preferably from soybeans, and still more preferably from cotyledons.

Hemicellulose, particularly water-soluble hemicellulose, may be obtained through extracting the above-mentioned starting materials using water, or dissolving, while applying heat, the materials under acidic or alkaline conditions when such treatment is necessary. Alternatively, it may be obtained through decomposing the starting materials using enzymes to make it soluble. Specifically, the following method may be used.

Briefly, the above-mentioned starting materials are decomposed with heat (preferably between 40° and 160° C., and more preferably between 100° and 130° C.) under acidic or alkaline conditions, and preferably at a pH in the vicinity of the isoelectric point of respective proteins (normally acidic pH), thereby fractionating water-soluble fractions. If an enzyme such as hemicellulase or a chelating agent such as EDTA is used during extraction, it is possible to extract a water-soluble fraction at relatively low temperatures. When the thus-obtained water-soluble fraction is dried, water-soluble hemicellulose is obtained. Before drying, the water-soluble fraction may be subjected to treatment with activated carbon, adsorption onto resins, or precipitation in ethanol to remove hydrophobic substances and low molecular weight substances.

The molecular weight of the thus-obtained water-soluble hemicellulose is not particularly limited. In order to obtain sufficient effects of reducing efforescence and bleeding, average molecular weight is preferably between 10,000 and 1,000,000, and more preferably between 50,000 and 500,000.

The hemicellulose which is used in the present invention may take the form of sugar or a sugar derivative, and it encompasses rhamnose, fucose, arabinose, xylose, galactose, glucose, uronic acid, mannose, lactose, etc. Uronic acid encompasses galacturonic acid, glucuronic acid, mannuronic acid, etc. The composition of uronic acid is not particularly limited. However, the presence of uronic acid is important in order to reduce efforescence and bleeding.

Methyl esters of uronic acid are preferably demethoxylated. Thus, esterfication degree is preferably 50% or less, and more preferably 20% or less.

Demethoxylation may be performed using an acid, an alkali, or an enzyme such as pectin esterase.

The uronic acid content in hemicellulose which is used in the present invention is preferably 2–50% by weight, and more preferably 5–40% by weight, in order to sufficiently reduce efforescence and bleeding.

With respect to 100 parts of the cement base, the amount of hemicellulose is preferably 0.01–1 part by weight, more preferably 0.01–0.5 parts by weight, and particularly preferably 0.1–0.3 parts by weight. Amounts less than 0.01 parts by weight provide only small effects, whereas amounts in excess of 1 part by weight no longer enhance the effects.

Since cement compositions comprising hemicellulose exhibit excellent dispersing effects, coagulation of cement particles is suppressed, and as a result, generation of bleeding is prevented. This is considered to be the mechanism through which generation of weak portions in the surface area is reduced, and thus strengthening the surface. Consequently, SL materials comprising the cement composition of the present invention have improved surface adhesion strength. Moreover, since less water is bled, smaller amounts of efforescence are formed.

The SL materials of the present invention comprise, in addition to the aforementioned cement composition, an aggregate, a fluidizing agent, a thickener, and a defoamer. As the aggregate, river sand, sea sand, land sand, crushed sand, silica sand, etc. may be used. Fluidizing agents are broadly categorized as naphthalene-type, melamin-type, polycarboxylic acid-type, and aminosulfonic acid-type. In the present invention, fluidizing agents of a polycarboxylic acid-type are preferred because they have enhanced fluidity retention effects. Thickeners are used for the purpose of preventing separation of the components of an SL composition. As the thickener of the present invention, a water-soluble polymer such as methylcellulose, hydroxyethylcellulose, and carboxymethylcellulose is preferably used. Defoamers are used for the purpose of preventing swelling or depression caused by bubbles. Generally, nonionic surfactants such as polydimethylsiloxane and polyoxyalkylene ether are used as defoamers. When needed, water may also be incorporated. The amount of water is generally determined such that it is adapted to the quality requirements described in JASS15M-103 "Quality Standards for Self-leveling Materials" by the Architectural Institute of Japan.

According to the present invention, cement compositions causing reduced efforescence and less bleeding can be obtained. Moreover, self-leveling materials containing the cement compositions of the invention not only cause reduced efforescence and less bleeding, but also have improved surface adhesion strength.

EXAMPLES

The present invention will be described by way of examples, which should not be construed as limiting the invention.

Examples 1–6 and Comparative Examples 1–2

The cement compositions shown in Table 2 which were formulated in accordance with JIS mortars, in which the ratio (by weight) of cement base to standard sand was 1:2 and water/cement ratio was 65/100, were tested via the following methods and evaluated. The results are also shown in Table 2.

Test Methods (1) Method for mixing

Mixing was performed in accordance with JIS R5201 "Physical test method for cement."

(2) Fluidity test

Fluidity tests were performed in accordance with JIS R5201 "Physical test method for cement."

(3) Method for measuring amounts of water bleeding

A cement composition was charged into a plastic box measuring 20 cm×15 cm to a height of 15 mm. The amount of water bleeding was measured using a measuring cylinder after 20 hours after charging. This test was performed in a 5° C. thermostatic chamber. Mixing and fluidity tests were also performed in the same chamber.

(4) Efforescence formation test

A cement composition was charged into a plastic box measuring 20 cm×15 cm to a height of 15 mm. The charged composition was cured for 5 days under the below-described environmental conditions (Table 1). Subsequently, efforescence powder formed on the surface was collected using a brush. The amount of the powder was converted to g/m$^2$ for making comparison.

TABLE 1

| | |
|---|---|
| Temperature of air in the chamber | 7° C. (for 1 day, sealed curing), and 5° C. (day 2 and subsequent days) |
| Humidity of air in the chamber | not less than 90% (for 1 day, sealed curing), and 70% (day 2 and subsequent days) |
| Velocity of air in the chamber | 0.1–0.2 m/sec (day 2 and subsequent days) |
| $CO_2$ concentration | 5% (day 2 and subsequent days) |
| Period of curing | 5 days |

TABLE 2

| | (parts by weight) | | | | | | | |
|---|---|---|---|---|---|---|---|---|
| | Examples of Invention | | | | | | Comparative Ex. | |
| | 1 | 2 | 3 | 4 | 5 | 6 | 1 | 2 |
| Base materials | | | | | | | | |
| Cement*[1] | 100 | 100 | 100 | 100 | 100 | 85 | 100 | 85 |
| Fly ash*[2] | — | — | — | — | — | 15 | — | 15 |
| Hemicellulose*[3] | 0.05 | 0.2 | 0.5 | 0.8 | 1.0 | 0.5 | — | — |
| Aggregate*[4] | 200 | 200 | 200 | 200 | 200 | 200 | 200 | 200 |
| Water | 65 | 65 | 65 | 65 | 65 | 65 | 65 | 65 |
| Amount of efforescence (g/m$^2$) | 1.25 | 0.70 | 0.35 | 0.03 | 0 | 0.50 | 2.05 | 3.20 |
| Amount of water bleeding (ml) | 2.5 | 0.3 | 0 | 0 | 0 | 0 | 7.2 | 9.7 |
| Fluidity test (mm) | 219 | 233 | 223 | 221 | 217 | 227 | 220 | 232 |

*[1]: Ordinary portland cement (product of Chichibu-Onoda K.K.)
*[2]: Fly ash according to JIS standards (Blaine specific surface area: 2980 cm$^2$/g)
*[3]: Soya-Five S-DN (made from soybeans, product of Fuji Seiyu K.K.)
*[4]: Standard sand produced in Toyoura From the above test results, it was discovered that, in the cement compositions in which 0.01–1 part by weight of hemicellulose was added to 100 parts by weight of the cement base, efforescence and water bleeding were both reduced as the amount of hemicellulose increased, and in addition, this increase in amounts added did not reduce the fluidity of the compositions. It was also found that when hemicellulose was added in amounts of 0.2–0.5 parts by weight, amounts of water bleeding were satisfactorily reduced.

Examples 7–16 and Comparative Examples 3–8

The SL materials having compositions in Tables 4 and 5 and containing hemicelluloses shown in Table 3 (all produced by Fuji Seiyu K. K.) were tested via the following methods and evaluated. The results are shown in Table 6.

Test Methods (1) Method for mixing

All the components in amounts shown in Tables 3 and 4 and water were placed in the mixing bowl of a Hobart mixer. SL materials were prepared through mixing at a low speed for 1 minute and then at a medium speed for 2 minutes.

(2) Flow test

In accordance with the method described in JASS15M-103 "Quality Standards for Self-leveling Materials" by the Architectural Institute of Japan, a slurry obtained via mixing was poured into a flow cone placed at the center of a flow plate. The flow cone was removed upward in a vertical direction, and the amount of flow of the slurry (flow value) was measured.

(3) Surface adhesion strength

A primer was applied to a polished surface of a mortar plate having a size of 300 mm×300 mm×10 mm. After the primer was dried for 24 hours, a sample (i.e., an SL material) was poured thereon. The sample was cured for 48 hours in the presence of moisture and air, and then cured until day 14 in a curing chamber. A steel plate having a size of 40 mm×40 mm was affixed onto the surface of the solidified SL material using an epoxy resin. The steel plate was pulled using a hydraulic jack until exfoliated. The maximum tensile force during pulling was measured.

The test for measuring surface adhesion strength was performed in a 30° C. thermostatic chamber to simulate a summer environment. Mixing and fluidity tests were also performed in the same chamber.

(4) Efforescence formation test

The above-described method for cement compositions was repeated. To simulate a winter environment, the test was performed in a 5° C. thermostatic chamber.

TABLE 3

| | <Composition analysis of hemicelluloses> | | |
|---|---|---|---|
| | Soya-Five S-DN | Hemicellulose X | Hemicellulose Y |
| Starting material | Soybeans | Beats | Corn |
| Water (wt %) | 5.2 | 8.6 | 2.3 |
| Crude protein (wt %) | 7.8 | 2.6 | 6.6 |
| Crude ash (wt %) | 8.2 | 11.0 | 1.7 |
| Av. molecular weight | 142,000 | 342,000 | 156,000 |
| Uronic acid (wt %) | 18.1 | 34.7 | 5.5 |
| Esterification degree (%) | 0 | 5.2 | 10.2 |

TABLE 4

(parts by weight)
Examples of Invention

| | 7 | 8 | 9 | 10 | 11 | 12 | 13 | 14 | 15 | 16 |
|---|---|---|---|---|---|---|---|---|---|---|
| Base materials | | | | | | | | | | |
| Cement*[1] | 100 | 100 | 100 | 100 | 100 | 100 | 100 | 70 | 70 | 85 |
| Gypsum*[2] | — | — | — | — | — | — | — | 30 | 30 | — |
| Fly ash*[3] | — | — | — | — | — | — | — | — | — | 15 |
| Soya-Five S-DN | 0.03 | 0.06 | 0.1 | 0.3 | 0.5 | — | — | 0.1 | 0.3 | 0.3 |
| Hemicellulose X | — | — | — | — | — | 0.3 | — | — | — | — |
| Hemicellulose Y | — | — | — | — | — | — | 0.3 | — | — | — |
| Thickener*[4] | 0.2 | 0.2 | 0.2 | 0.2 | 0.2 | 0.2 | 0.2 | 0.2 | 0.2 | 0.2 |
| Defoamer*[5] | 0.2 | 0.2 | 0.2 | 0.2 | 0.2 | 0.2 | 0.2 | 0.2 | 0.2 | 0.2 |
| Aggregate*[6] | 100 | 100 | 100 | 100 | 100 | 100 | 100 | 100 | 100 | 100 |
| Fluidizing agent*[7] | 1.0 | 1.0 | 1.0 | 1.2 | 1.4 | 1.0 | 1.0 | 1.0 | 1.0 | 1.0 |
| Water | 48 | 48 | 48 | 48 | 48 | 48 | 48 | 48 | 48 | 48 |

*[1]: Ordinary portland cement (product of Chichibu-Onoda K.K.)
*[2]: Natural anhydrous gypsum (produced in Thailand, Blaine specific surface area: 3900 cm²/g).
*[3]: Fly ash according to JIS standards (Blaine specific surface area: 2980 cm²/g)
*[4]: SEB-04T (methylcellulose, product of Shin-Etsu Chemical Co., Ltd.)
*[5]: SN-Defoamer 14HP (alcohol-type noninoic surfactant), product of Sunnopco)
*[6]: Silica sand (produced in Yamagata, F.M. = 2.3)
*[7]: Chupole HP-11 (Takemoto Yushi K.K.)

TABLE 5

Comparative Examples

| | 3 | 4 | 5 | 6 | 7 | 8 |
|---|---|---|---|---|---|---|
| Base materials | | | | | | |
| Cement*[1] | 100 | 100 | 100 | 70 | 70 | 85 |
| Gypsum*[2] | — | — | — | 30 | 30 | — |
| Fly ash*[3] | — | — | — | — | — | 15 |
| Soya-Five S-DN | — | 0.008 | 0.6 | — | 0.008 | — |
| Hemicellulose X | — | — | — | — | — | — |
| Hemicellulose Y | — | — | — | — | — | — |
| Thickener*[4] | 0.2 | 0.2 | 0.2 | 0.2 | 0.2 | 0.2 |
| Defoamer*[5] | 0.2 | 0.2 | 0.2 | 0.2 | 0.2 | 0.2 |
| Aggregate*[6] | 100 | 100 | 100 | 100 | 100 | 100 |
| Fluidizing agent*[7] | 1.0 | 1.0 | 1.4 | 1.0 | 1.0 | 1.0 |
| Water | 48 | 48 | 48 | 48 | 48 | 48 |

*[1]: Ordinary portland cement (product of Chichibu-Onoda K.K.)
*[2]: Natural anhydrous gypsum (produced in Thailand, Blaine specific surface area: 3900 cm²/g)
*[3]: Fly ash according to JIS standards (Blaine specific surface area: 2980 cm²/g)
*[4]: SEB-04T (methylcellulose, product of Shin-Etsu Chemical Co., Ltd.)
*[5]: SN-Defoamer 14HP (alcohol-type nonionic surfactant), product of Sunnopco)
*[6]: Silica sand (produced in Yamagata, F.M. = 2.3)
*[7]: Chupole HP-11 (Takemoto Yushi K.K.)

TABLE 6

<Test results>

| | 30° C. thermostatic chamber | | | 5° C. thermostatic chamber |
|---|---|---|---|---|
| | Flow value after mixed (mm) | Flow value after 6 hrs (mm) | Surface strength on day 28 (kg/cm²) | Amounts of efforescence (g/m²) |
| | Examples of the Invention | | | |
| Ex. 7 | 220 | 216 | 8.7 | 1.36 |
| Ex. 8 | 222 | 217 | 17.8 | 0.45 |
| Ex. 9 | 223 | 219 | 23.0 | 0.28 |
| Ex. 10 | 215 | 210 | 25.2 | 0.10 |
| Ex. 11 | 212 | 204 | 26.0 | 0.05 |
| Ex. 12 | 224 | 220 | 19.4 | 0.16 |
| Ex. 13 | 214 | 212 | 13.8 | 0.39 |
| Ex. 14 | 223 | 218 | 14.3 | 0.67 |

TABLE 6-continued

<Test results>

|  | 30° C. thermostatic chamber | | | 5° C. thermostatic chamber |
| --- | --- | --- | --- | --- |
|  | Flow value after mixed (mm) | Flow value after 6 hrs (mm) | Surface strength on day 28 (kg/cm$^2$) | Amounts of efforescence (g/m$^2$) |
| Ex. 15 | 224 | 219 | 19.6 | 0.48 |
| Ex. 16 | 221 | 215 | 20.4 | 0.54 |
| | | Comparative Examples | | |
| Com. Ex. 3 | 221 | 214 | 5.6 | 2.50 |
| Com. Ex. 4 | 221 | 215 | 6.0 | 2.32 |
| Com. Ex. 5 | 200 | 182 | 26.2 | 0.05 |
| Com. Ex. 6 | 223 | 216 | 4.5 | 3.38 |
| Com. Ex. 7 | 222 | 215 | 4.6 | 3.62 |
| Com. Ex. 8 | 220 | 213 | 5.2 | 3.20 |

From the above test results, it was discovered that, in the SL materials in which 0.01–0.5 parts by weight of hemicellulose was added to 100 parts by weight of the cement base, efforescence and water bleeding were both reduced, and in addition, surface adhesion strength was enhanced. Moreover, when hemicellulose in the above range was added, it is possible to obtain sustained fluidity (enhanced working efficiency) which is essential in SL materials. In other words, it is possible to secure the minimum flow value after 6 hours of not less than 200. It was also found that when hemicellulose was added in amounts of 0.05–0.1 parts by weight, excellent SL materials were obtained, exhibiting good fluidity and suppressing separation of components.

What is claimed is:

1. A cement composition, comprising a cement base and a water-soluble hemicellulose obtained from soybeans, wherein said hemicellulose has an average molecular weight of between about 10,000 and 1,000,000.

2. The cement composition of claim 1, wherein said hemicellulose has an average molecular weight of between about 50,000 and 500,000.

3. The cement composition of claim 1, wherein said hemicellulose has a uronic acid content of about 2 to 50% by weight.

4. The cement composition of claim 2, wherein said hemicellulose has a uronic acid content of about 5 to 40% by weight.

5. The cement composition of claim 3, wherein the uronic acid has an esterification degree of not more than 50%.

6. The cement composition of claims 1, comprising about 0.01 to 1 part by weight of hemicellulose per about 100 parts by weight of said cement base.

7. The cement composition of claim 6, comprising about 0.01 to 0.5 parts by weight of hemicellulose per about 100 parts by weight of said cement base.

8. The cement composition of claim 7, comprising about 0.1 to 0.3 parts by weight of hemicellulose per about 100 parts by weight of said cement base.

9. A self-leveling material, comprising a cement composition, an aggregate, a fluidizing agent, a thickener, and a defoamer; said cement composition comprises a cement base and a water-soluble hemicellulose obtained from soybeans, wherein said hemicellulose has an average molecular weight of between about 10,000 and 1,000,000.

* * * * *